US011307896B1

(12) United States Patent
MacNeil et al.

(10) Patent No.: US 11,307,896 B1
(45) Date of Patent: Apr. 19, 2022

(54) APPARATUS, SYSTEM, AND METHOD FOR LOCKLESS RESOURCE RECLAMATION IN SINGLE WRITER MULTIPLE READER TECHNOLOGIES

(71) Applicant: Juniper Networks, Inc., Sunnyvale, CA (US)

(72) Inventors: Erin C. MacNeil, Sunnyvale, CA (US); Amit Kumar Rao, Sunnyvale, CA (US); Finlay Michael Graham Pelley, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 43 days.

(21) Appl. No.: 16/907,348

(22) Filed: Jun. 22, 2020

(51) Int. Cl.
| | | |
|---|---|---|
| *G06F 9/50* | (2006.01) |
| *G06F 9/54* | (2006.01) |
| *G06F 16/176* | (2019.01) |
| *G06F 16/16* | (2019.01) |
| *G06F 16/17* | (2019.01) |
| *G06F 9/52* | (2006.01) |

(52) U.S. Cl.
CPC .......... *G06F 9/5016* (2013.01); *G06F 9/5022* (2013.01); *G06F 9/524* (2013.01); *G06F 9/544* (2013.01); *G06F 16/162* (2019.01); *G06F 16/1734* (2019.01); *G06F 16/1774* (2019.01)

(58) Field of Classification Search
CPC .. G06F 9/5016; G06F 16/162; G06F 16/1774; G06F 16/1734; G06F 9/5022; G06F 9/524; G06F 9/544
See application file for complete search history.

(56) References Cited

U.S. PATENT DOCUMENTS

| | | | |
|---|---|---|---|
| 6,173,375 B1 * | 1/2001 | Arshad ..................... | G06F 9/52 711/147 |
| 10,073,874 B1 * | 9/2018 | Sivathanu ............... | G06F 16/31 |
| 2004/0107227 A1 * | 6/2004 | Michael ................ | G06F 9/5022 |
| 2004/0264384 A1 * | 12/2004 | Deval ................... | H04L 45/023 370/252 |
| 2011/0252000 A1 * | 10/2011 | Diaconu ............. | G06F 16/2379 707/638 |

* cited by examiner

*Primary Examiner* — Emerson C Puente
*Assistant Examiner* — Jonathan R Labud
(74) *Attorney, Agent, or Firm* — FisherBroyles, LLP

(57) ABSTRACT

A disclosed method may include (1) maintaining a set of fleeting contexts that represent a lockless data structure at different moments in time, (2) determining an oldest context within the set of fleeting contexts, (3) identifying, within a discard list of the oldest context, a reference to an object stored in shared memory, and then (4) reclaiming, in the shared memory, a memory location occupied by the object whose reference was identified within the discard list of the oldest context. Various other apparatuses, systems, and methods are also disclosed.

18 Claims, 7 Drawing Sheets

Discard List
152(1)

----------------------------------------------------------------------
**************************************************

Reference 502
Reference 504
Reference 506
Reference 508
Reference 510
Reference 512
Reference 514

APPARATUS, SYSTEM, AND METHOD FOR LOCKLESS RESOURCE RECLAMATION IN SINGLE WRITER MULTIPLE READER TECHNOLOGIES

BACKGROUND

Resource reclamation often involves reclaiming, releases, and/or deallocating computing resources (such as memory space) that are no longer being used or accessed by any processes running on a computing device and/or distributed system. For example, an operating system or application may reclaim, release, and/or deallocate a specific memory location in shared memory such that the memory location is subsequently available to store a new object. In one example, the operating system or application may initiate such reclamation, release, and/or deallocation upon determining that the previous object occupying that memory location is no longer being used any processes.

Unfortunately, in the context of a single writer multiple reader implementation, certain problems that impair the device's and/or system's performance may arise. For example, a conventional computing device and/or distributed system may implement a locking mechanism that enables the various readers and the single writer to lock objects stored in shared memory. In this example, a locked object in shared memory may be unreadable and/or overwritable for all processes that did not initiate the lock themselves. When the object is no longer needed, the last reader to access the object may release it for reclamation. Such a locking mechanism may be inefficient as ideally all the readers should be able to access any object in shared memory simultaneously. Moreover, the procedure for locking and/or unlocking those objects may take time and/or consume processing power, thereby potentially impairing performance.

As an additional example, a conventional computing device and/or distributed system may implement a read counting mechanism that tracks the number of readers currently accessing the objects stored in shared memory. In this example, the readers may increment the read count of an object stored in shared memory upon accessing that object, and the readers may decrement the read count of an object stored in shared memory once they no longer need that object. When the read count of an object reaches zero, the object may be released for reclamation. The procedure for incrementing and/or decrementing the read count of those objects may take time and/or consume processing power or memory, thereby potentially impairing performance.

The instant disclosure, therefore, identifies and addresses a need for additional and improved apparatuses, systems, and methods for lockless resource reclamation in single writer multiple reader technologies.

SUMMARY

As will be described in greater detail below, the instant disclosure generally relates to apparatuses, systems, and methods for lockless resource reclamation in single writer multiple reader technologies. In one example, a method for accomplishing such a task may include (1) maintaining a set of fleeting contexts that represent a lockless data structure at different moments in time, (2) determining an oldest context within the set of fleeting contexts, (3) identifying, within a discard list of the oldest context, a reference to an object stored in shared memory, and then (4) reclaiming, in the shared memory, a memory location occupied by the object whose reference was identified within the discard list of the oldest context.

Similarly, a system that implements the above-identified method may include a single writer and a set of readers. In one example, this system may include at least one physical processing device configured to execute the writer and the set of readers such that the writer (1) maintains a set of fleeting contexts that represent a lockless data structure at different moments in time, (2) determines an oldest context within the set of fleeting contexts, (3) identifies, within a discard list of the oldest context, a reference to an object stored in shared memory, and then (4) reclaims, in the shared memory, a memory location occupied by the object whose reference was identified within the discard list of the oldest context.

Additionally or alternatively, an apparatus that implements the above-identified method may include at least one storage device that maintains a set of fleeting contexts that represent a lockless data structure at different moments in time. This apparatus may also include at least one physical processing device communicatively coupled to the storage device. This physical processing device may (1) determine an oldest context within the set of fleeting contexts, (2) identifies, within a discard list of the oldest context, a reference to an object stored in shared memory, and then (3) reclaim, in the shared memory, a memory location occupied by the object whose reference was identified within the discard list of the oldest context.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary discard list that includes certain references to objects that are released for reclamation from shared memory.

Figure 1:
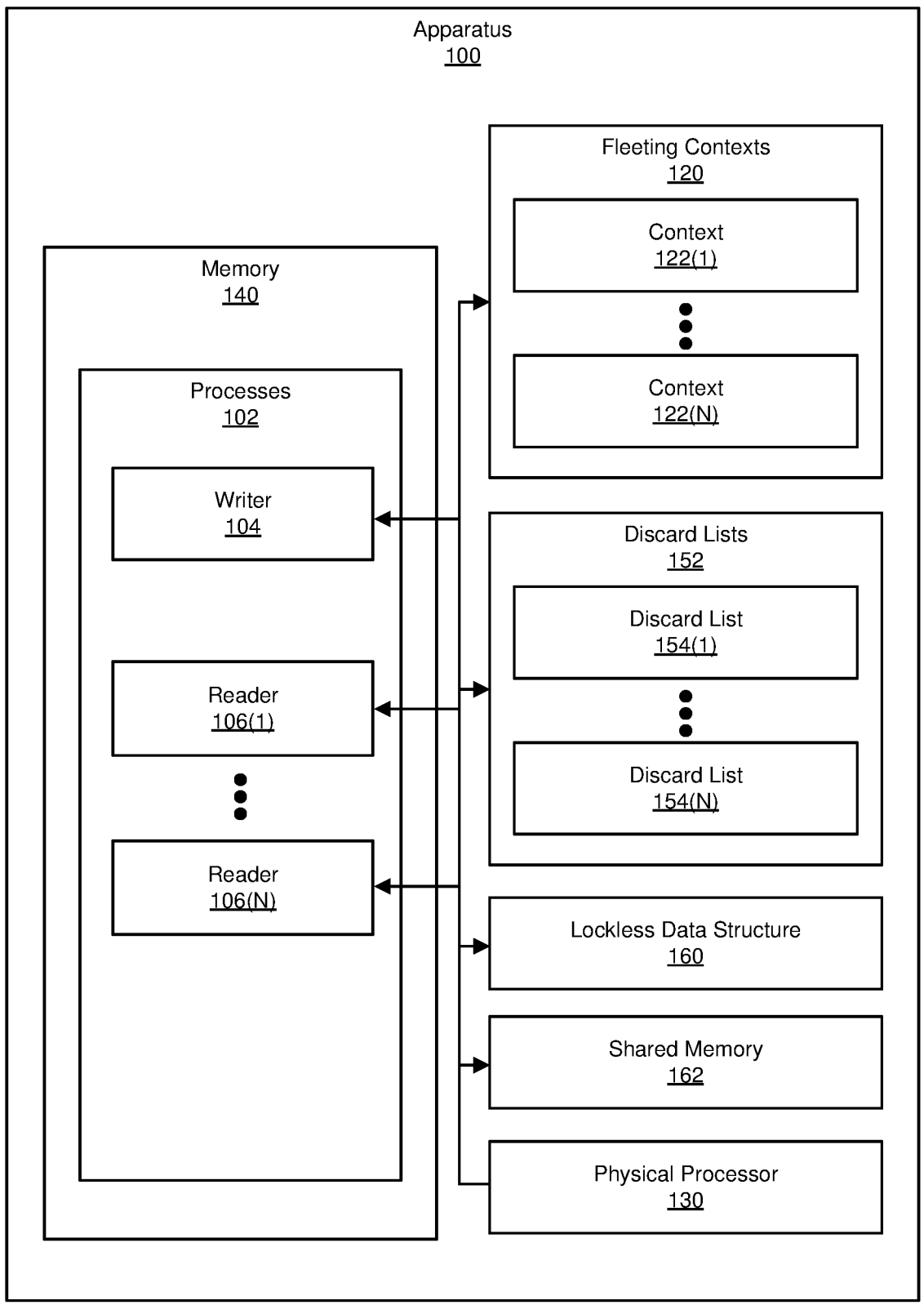
FIG. 1 is a block diagram of an exemplary apparatus for lockless resource reclamation in single writer multiple reader technologies.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for lockless resource reclamation in single writer multiple reader technologies. As will be explained in greater detail below, the various apparatuses, systems, and methods described herein may provide benefits and/or advantages over some traditional single writer multiple reader technologies. For example, the various apparatuses, systems, and methods described herein may enable multiple readers running on a computing device to access an object stored in shared memory simultaneously, as opposed to locking out all other readers while accessing that object. In doing so, these apparatuses, systems, and methods may be able to save the time and/or conserve the processing power involved in implementing locking mechanisms, thereby potentially improving the performance of certain single writer multiple reader technologies.

In another example, the various apparatuses, systems, and methods described herein may enable multiple readers running on a computing device to access an object stored in shared memory without tracking the number of readers currently accessing that object. In doing so, these apparatuses, systems, and methods may be able to save the time and/or conserve the processing power involved in tracking the number of readers currently accessing objects in shared memory, thereby potentially improving the performance of certain single writer multiple reader technologies.

The following will provide, with reference to FIGS. 1, 2, 4, and 6, detailed descriptions of exemplary apparatuses, systems, and corresponding implementations for lockless resource reclamation in single writer multiple reader technologies. Detailed descriptions of an exemplary method for lockless resource reclamation in single writer multiple reader technologies will be provided in connection with FIG. 3. Detailed descriptions of an exemplary discard list will be provided in connection with FIG. 5. In addition, detailed descriptions of an exemplary computing system for carrying out these methods will be provided in connection with FIG. 7.

FIG. 1 shows an exemplary apparatus 100 that facilitates lockless resource reclamation in single writer multiple reader technologies. As illustrated in FIG. 1, apparatus 100 may include one or more processes 102 for performing one or more tasks. As will be explained in greater detail below, processes 102 may include a writer 104 and a set of readers 106(1)-(N). In some examples, writer 104 and readers 106(1)-(N) may operate and/or function independently of one another. Although illustrated as separate elements, one or more of processes 102 in FIG. 1 may represent portions of a single module, application, and/or operating system.

In certain embodiments, one or more of processes 102 in FIG. 1 may represent one or more software applications or programs that, when executed by a computing device, cause the computing device to perform one or more tasks. For example, and as will be described in greater detail below, one or more of processes 102 may represent processes stored and configured to run on one or more computing devices, such as the devices illustrated in FIG. 2 (e.g., computing devices 202, 224, and 226) and/or the devices illustrated in FIG. 7 (e.g., computing system 700). One or more of processes 102 in FIG. 1 may also represent all or portions of one or more special-purpose computers configured to perform one or more tasks.

As illustrated in FIG. 1, exemplary apparatus 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of processes 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary apparatus 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of processes 102 stored in memory 140. Additionally or alternatively, physical processor 130 may execute one or more of processes 102 to facilitate lockless resource reclamation in single writer multiple reader technologies. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary apparatus 100 may further include and/or maintain a set of fleeting contexts 120. In one example, the set of fleeting contexts 120 may include and/or represent at least a context 122(1) and/or a context 122(N). In this example, the set of fleeting contexts 120 may represent a lockless data structure at different moments in time. Accordingly, each context within the set of fleeting contexts 120 may constitute and/or represent a consistent and/or persistent snapshot of the lockless data structure at a given time. In some embodiments, multiple readers running on a computing device may be able to access objects stored in shared memory via the set of fleeting contexts 120.

In some examples, the set of fleeting contexts 120 may include and/or represent a chronological sequence of contexts available to the set of fleeting contexts 120 for accessing those objects stored in shared memory. In one example, a writer running on the computing device may create and/or publish a new context that includes, represents, and/or accounts for one or more changes made to the lockless data structure and/or the objects referenced by the lockless data structure in shared memory. In this example, the writer may create and/or publish new contexts on an as-needed basis and/or whenever necessary to account for changes made to the lockless data structure and/or the objects referenced by the lockless data structure in shared memory.

As illustrated in FIG. 1, exemplary apparatus 100 may additionally include and/or maintain a set of discard lists 152 in connection with the set of fleeting contexts 120. In one example, the set of discard lists 152 may include and/or represent at least a discard list 154(1) and/or a discard list 154(N). In this example, the set of discard lists 152 may correspond to and/or be incorporated in the set of fleeting contexts 120. Each discard list within the set of discard lists 152 may include and/or represent one or more references to objects stored in shared memory. Such references may correspond to and/or indicate those objects that have been removed from the context in question.

As a specific example, if an object is no longer needed and/or no longer belongs in the lockless data structure, the writer may create and/or publish a new context that represents a snapshot of the lockless data structure at that moment in time. In this example, the new context may include and/or incorporate a discard list that contains a reference to that object. This reference to that object may indicate that the object is no longer needed by the readers and/or indicate that the readers have effectively released the object for reclamation. Accordingly, the presence of this reference in the discard list may prompt and/or trigger the deletion of that object from shared memory. Additionally or alternatively, the presence of this reference in the discard list may prompt and/or trigger the freeing and/or deallocation of the memory location occupied by that object in shared memory.

As illustrated in FIG. 1, exemplary apparatus 100 may also include and/or maintain a lockless data structure 160. In one example, lockless data structure 160 may include and/or represent a lock-free database, datastore, and/or linked list that references and/or identifies the locations of the objects stored in shared memory. In this example, lockless data structure 160 may be used and/or referenced by readers running on the computing device to identify and/or access the objects stored in shared memory.

As illustrated in FIG. 1, exemplary apparatus 100 may also include and/or maintain shared memory 162. In one example, shared memory 162 may include and/or represent all or a portion of a physical storage device (such as any type or form of volatile or non-volatile storage device or medium described above in connection with memory 140). In this example, shared memory 162 may store and/or maintain the objects referenced by lockless data structure 160 and/or accessible to the readers and/or the writer running on the computing device. In one embodiment, shared memory 162 may constitute and/or represent a portion of memory 140. In another embodiment, shared memory 162 may constitute and/or represent all or a portion of a storage device distinct and/or separate from memory 140.

Figure 2:
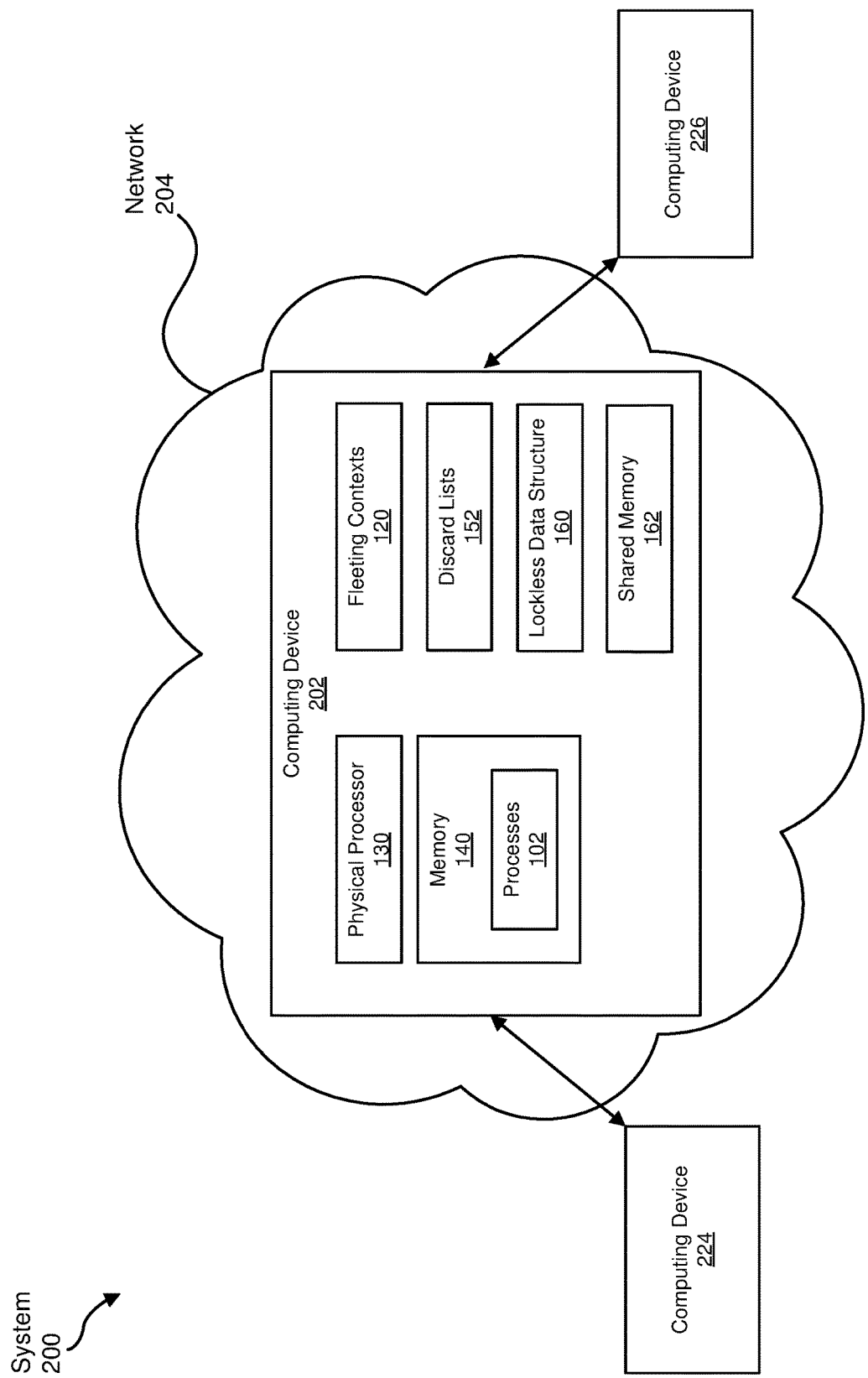
FIG. 2 is a block diagram of an exemplary system for lockless resource reclamation in single writer multiple reader technologies.

In some examples, apparatus 100 in FIG. 1 may be implemented in a variety of ways. For example, all or a portion of exemplary apparatus 100 may represent portions of exemplary system 200 in FIG. 2. As shown in FIG. 2, system 200 may include a network 204 that facilitates communication among various computing devices (such as computing devices 202, 224, and 226). Although FIG. 2 illustrates computing devices 224 and 226 as being external to network 204, computing devices 224 and 226 may alternatively represent part of and/or be included within network 204.

In some examples, network 204 may include and/or represent various network devices that form and/or establish communication paths and/or segments. For example, network 204 may include and/or represent one or more segment routing paths. Although not illustrated in this way in FIG. 2, network 204 may include and/or represent one or more additional network devices and/or computing devices.

In some examples, and as will be described in greater detail below, one or more of processes 102 may cause computing device 202 to (1) maintain the set of fleeting contexts 120, which represent lockless data structure 160 at different moments in time, (2) determine the oldest context within the set of fleeting contexts 120, (3) identify, within a discard list of the oldest context, a reference to an object that (A) is included in lockless data structure 160, (B) is stored in shared memory 162 in connection with lockless data structure 160, and (C) has been removed from the oldest context, and then (4) delete, from shared memory 162, the object whose reference was identified within the discard list of the oldest context to free a memory location occupied by the object in shared memory 162.

Computing devices 202, 224, and 226 each generally represent any type or form of physical computing device capable of reading computer-executable instructions and/or handling network traffic. Examples of computing devices 202, 224, and 226 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing devices.

Network 204 generally represents any medium or architecture capable of facilitating communication or data transfer. In some examples, network 204 may include other devices not illustrated in FIG. 2 that facilitate communication and/or form part of routing paths among computing devices 202, 224, and 226. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
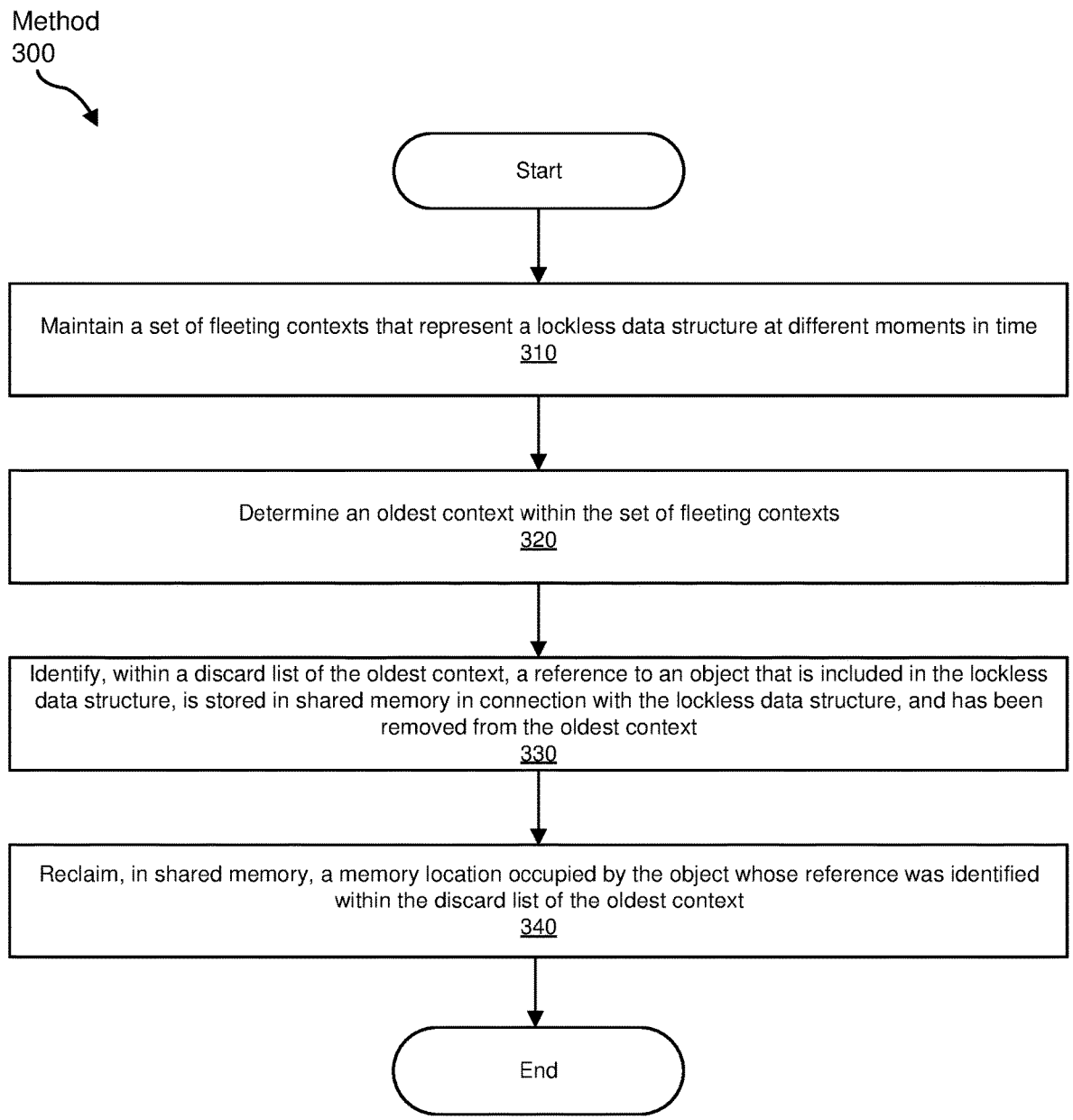
FIG. 3 is a flow diagram of an exemplary method for lockless resource reclamation in single writer multiple reader technologies.

FIG. 3 is a flow diagram of an exemplary computer-implemented method 300 for lockless resource reclamation in single writer multiple reader technologies. The steps shown in FIG. 3 may be performed by any suitable computer-executable code and/or computing system, including apparatus 100 in FIG. 1, system 200 in FIG. 2, implementation 400 in FIG. 4, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may maintain a set of fleeting contexts that represent a lockless data structure at different moments in time. For example, writer 104 may, as part of computing device 202 in FIG. 2, maintain the set of fleeting contexts 120, which represent lockless data structure 160 at different moments in time. In one example, context 122(1) may correspond to and/or represent the state of lockless data structure 160 at 12:30:00 PM on Dec. 25, 2019, and context 122(N) may correspond to and/or represent the state of lockless data structure 160 at 12:30:01 PM on Dec. 25, 2019.

The systems described herein may perform step 310 in a variety of ways and/or contexts. In some examples, writer 104 may organize and/or manage the set of fleeting contexts 120. Additionally or alternatively, writer 104 may provide the set of fleeting contexts 120 to multiple readers (not necessarily illustrated in FIG. 2) running on computing device 202 in connection with a single writer multiple reader technology and/or implementation. In other words, writer 104 may enable the multiple readers running on computing device 202 to access or read objects and/or resources stored in shared memory 162 via the set of fleeting contexts 120.

In one example, writer 104 may create and/or publish new contexts on an as-needed basis and/or whenever necessary to account for changes made to lockless data structure 160 and/or the objects referenced by lockless data structure 160 in shared memory 162. For example, when a new object is referenced by lockless data structure 160 and/or added to shared memory 162, writer 104 may create and/or publish a new context that incorporates and/or accounts for the new object. In another example, when an object referenced by lockless data structure 160 and/or stored in shared memory 162 is modified, writer 104 may create and/or publish a new context that incorporates and/or accounts for the modified object. In a further example, when an object referenced by lockless data structure 160 and/or stored in shared memory 162 is removed or no longer needed, writer 104 may create and/or publish a new context that excludes and/or accounts for the removed object (in, e.g., a discard list).

In some examples, the set of fleeting contexts 120 may be temporary and/or short-lived in nature. Accordingly, the oldest of fleeting contexts 120 may be removed and/or discarded when no longer needed and/or accessed by any of the readers running on computing device 202. For example, every time a reader accesses an object via one of fleeting contexts 120, that reader may do so via the newest and/or most recently published of fleeting contexts 120. In this example, as new contexts are published and/or added to the set of fleeting contexts 120, the older contexts within the set of fleeting contexts may become less and less accessed and/or used by the readers running on computing device 202. This trend may continue until the oldest reader within the set of fleeting contexts becomes totally obsolete to those readers. Once the oldest context within the set of fleeting contexts becomes totally obsolete, writer 104 may remove, discard, and/or delete that context. As a result, that obsolete context may no longer be included in and/or counted among the set of fleeting contexts 120.

In some examples, writer 104 may create, prepare, and/or stage a new context for publication to the readers running on computing device 202. At this point, the new context may yet to be published to those readers. Accordingly, those readers may be unable to access and/or read objects referenced in the new context until that new context is actually published.

In some examples, writer 104 may create and/or publish a new context multiple times per second. In other examples, writer 104 may refrain from creating and/or publishing a new context for multiple seconds at a time. The creation and/or publication frequency of these contexts may depend on and/or be driven by changes (e.g., additions, deletions, and/or modifications) made to objects stored in shared memory 162.

In some examples, writer 104 may create, prepare, and/or stage a new discard list for publication in connection with a new context. In other words, the new discard list may be incorporated into the new context and/or be published simultaneously with the new context. As will be described in greater detail below, the objects included in the discard list may be released, removed, and/or deleted from shared memory 124 once the context corresponding to the discard list becomes obsolete to the readers running on computing device 202.

Returning to FIG. 3, at step 320 one or more of the systems described herein may determine the oldest context within the set of fleeting contexts. For example, writer 104 may, as part of computing device 202 in FIG. 2, determine which of the set of fleeting contexts 120 is the oldest. In one example, context 122(1) may be older than all the others included in and/or added to the set of fleeting contexts 120, and context 122(N) may be younger than all the others included in and/or added to the set of fleeting contexts 120. In another example, context 122(N) may be older than all the others included in and/or added to the set of fleeting contexts 120, and context 122(1) may be younger than all the others included in and/or added to the set of fleeting contexts 120.

The systems described herein may perform step 320 in a variety of ways and/or contexts. In some examples, writer 104 may monitor and/or track the ages and/or publication times of the set of fleeting contexts 120. In one example, writer 104 may determine and/or identify the context with the oldest and/or least recent publication time. Additionally or alternatively, writer 104 may determine that the oldest context is not currently being accessed by any of the readers running on computing device 202.

As will be described in greater detail below, writer 104 may determine and/or identify the oldest context within the set of fleeting contexts 120 to facilitate deleting the objects identified in its discard list and/or reclaiming the memory locations at which those objects are stored in shared memory 162.

In some examples, writer 104 may identify all the readers capable of reading objects stored in shared memory 162 via the set of fleeting contexts 120. In one example, writer 104 may determine that none of those readers are currently reading any of the objects via context 122(1). For example, writer 104 may identify a set of logs that collectively indicate all the contexts currently being accessed by those readers. In this example, each log may include and/or represent a file and/or a portion of file. Writer 104 may determine that none of those readers are currently accessing context 122(1) but at least one of those readers is currently accessing all the others within the set of fleeting contexts 120.

In some examples, one or more of those logs may correspond to and/or represent one or more active readers. Additionally or alternatively, one or more of those logs may correspond to and/or represent failed readers. In one example, writer 104 may leverage the information contained in all the active logs to determine which, if any, of the readers are currently accessing the oldest context. In another example, writer 104 may disregard and/or ignore the information contained in all the failed logs when making the determination as to which, if any, of the readers are currently accessing the oldest context. At one extreme, if all the logs correspond to and/or represent active readers, writer 104 may rely on the information contained in all those active logs when determining that none of the readers are currently accessing the oldest context. At the other extreme, if all the logs correspond to and/or represent failed readers, writer 104 may disregard and/or ignore the information contained in all those failed logs when determining that none of the readers are currently accessing the oldest context.

Returning to FIG. 3, at step 330 one or more of the systems described herein may identify, within a discard list of the oldest context, a reference to an object that is included in the lockless data structure, is stored in shared memory in connection with the lockless data structure, and/or has been removed from the oldest context. For example, writer 104 may, as part of computing device 202 in FIG. 2, identify a reference to a specific object within discard list 154(1), which corresponds to and/or is associated with context 122(1). In this example, the referenced object may be included in lockless data structure 160 and/or stored in shared memory 162 in connection with data structure 160. Additionally or alternatively, the referenced object may have been removed from context 122(1) such that the referenced object is subsequently deleted from shared memory 162 and/or the memory location occupied by the referenced object is subsequently reclaimed in shared memory 162.

The systems described herein may perform step 330 in a variety of ways and/or contexts. In some examples, writer 104 may search context 122(1) for its discard list. While searching context 122(1) in this way, writer 104 may identify, locate, and/or access discard list 154(1). Writer 104 may then identify each reference included in and/or specified by discard list 154(1).

Each reference included in and/or specified by one of discard lists 152 may point to and/or indicate a certain object stored in shared memory 162 and/or that object's memory location. Examples of such references include, without limitation, pointers, hashes, memory locations, combinations or variations of one or more of the same, and/or any other suitable references.

Each object may include and/or represent any type or form of data, file, portion of a file, and/or directory. In one example, each object may include and/or represent a route that identifies, indicates, and/or defines a particular forwarding path within, through, and/or across network 204 in FIG. 2. In this example, lockless data structure 160 may include and/or represent a Forwarding Information Base (FIB) and/or Routing Information Base (RIB) that contains or is loaded with various routes. Additional examples of such objects include, without limitation, data representations of and/or references to physical devices or interfaces (such an "ifd" objects), logical devices or interfaces (such as an "ifl" objects), next hops, routes (such as IPv4 or IPv6 routes), functions, variables, data structures, primitive types, records, routing tables, forwarding tables, buffers, host cache entries, memory addresses, network addresses, text segments, code segments, variations or combinations of one or more of the same, and/or any other suitable data objects.

As will be described in greater detail below, writer 104 may identify and/or locate all the references included in the discard list of context 122(1) and, by doing so, facilitate reclaiming the memory locations specified by those references in shared memory 162.

Returning to FIG. 3, at step 340 one or more of the systems described herein may reclaim, in the shared memory, a memory location occupied by the object whose reference was identified within the discard list of the oldest context. For example, writer 104 may, as part of computing device 202 in FIG. 2, reclaim the memory location occupied by the object whose reference was identified within the discard list of the oldest context. In this example, that memory location may represent part of and/or be included in shared memory 162. By doing so, writer 104 may prepare that memory location to store and/or hold another object. In other words, writer 104 may designate that memory location as available and/or open to store another object in place of the previous object.

The systems described herein may perform step 340 in a variety of ways and/or contexts. In some examples, writer 104 may release and/or deallocate the memory location occupied by the object whose reference was identified within the discard list of the oldest context. Additionally or alternatively, writer 104 may delete and/or remove the object whose reference was identified within that discard list from that memory location. For example, writer 104 may perform a delete operation on the object stored in shared memory 162 and/or on the memory location in which that object is stored. In another example, writer 104 may replace and/or overwrite the object stored in that memory location with another object.

In some examples, writer 104 may reclaim the memory location occupied by the object in shared memory 162 in response to and/or due at least in part to certain determinations and/or satisfied criteria. For example, writer 104 may reclaim the memory location in shared memory 162 if none of the readers are currently reading any of the objects via context 122(1) and if the reference to the object occupying that memory location is identified within discard list 152(1) of context 122(1).

In some examples, writer 104 may refrain from locking any of the objects in connection with lockless data structure 160. As a result, the readers running on computing device 202 may be able to read one or more of those objects during the delete operation and/or despite the delete operation.

In some examples, writer 104 may issue a command and/or system call to remove, discard, and/or delete an additional object that is stored in shared memory 162 in connection with lockless data structure 160. For example, writer 104 may determine that a certain object is no longer needed and/or no longer belongs in lockless data structure 160 and/or shared memory 162. In response to that determination, writer 104 may prepare an additional context that has yet to be published to those readers and represents lockless data structure 160 at a subsequent moment in time. In this example, writer 104 may create a discard list that includes a reference to the additional object to account for the command and/or system call. Writer 104 may then publish this context to those readers, thereby adding this context to the set of fleeting contexts 120.

Eventually, with the passage of time, this newly published context may become the oldest one among the set of fleeting contexts 120. In one example, writer 104 may determine, at a later moment in time, that this context has become the oldest one among the set of fleeting contexts 120. In this example, writer 104 may identify, within the discard list of this context, the reference to the additional object. In response to the identification of this reference, writer 104 may reclaim, release, and/or deallocate the additional memory location occupied by this additional object.

In some examples, writer 104 may perform a delete operation that removes and/or deletes the additional object altogether from in shared memory 162. Additionally or alternatively, writer 104 may perform an update operation that copies the additional object stored in the additional memory location, modifies that copy of the additional object, and/or stores the modified copy of that additional object to different memory location in shared memory 162.

In some examples, writer 104 may receive an update to one or more of the objects included in lockless data structure 160. In such examples, in response to the update, writer 104 may prepare and/or stage the additional context for publication to the readers running on computing device 202.

In some examples, writer 104 may receive a request to add one or more new objects to lockless data structure 160. In such examples, in response to the request, writer 104 may add those new objects to lockless data structure and/or prepare the additional context to account for those new objects prior to publication to the readers.

In some examples, one of the readers running on computing device 202 may detect and/or receive a command and/or system call to read one or more of the objects stored in shared memory 162. In such examples, the reader may determine and/or identify the newest and/or most recently published context within the set of fleeting contexts 120. That reader may then satisfy this command and/or system call by reading those objects via the newest and/or most recently published context.

In some examples, one or more of the systems described herein may determine whether any of the readers running on computing device 202 have failed and/or stalled. For example, writer 104 may attempt to apply a lock on at least a portion of the log that correspond to a specific reader. In this example, a successful lock may indicate and/or suggest that the specific reader has failed and/or stalled. In contrast, an unsuccessful lock may indicate and/or suggest that the specific reader is still operational and/or functional.

In one example, writer 104 may determine that the attempt to apply the lock on that reader is successful. In this example, writer 104 may determine and/or confirm that the reader is no longer functional or operational. In response to this determination and/or confirmation, computing device 202 may perform one or more actions in connection with that reader. Examples of such actions include, without limitation, disregarding the information contained in a log associated with a failed reader, shutting down a failed reader, restarting or rebooting a failed reader, replacing a failed reader, redistributing tasks for which a failed reader is responsible, combinations or variations of one or more of the same, and/or any other suitable actions.

Figure 4:
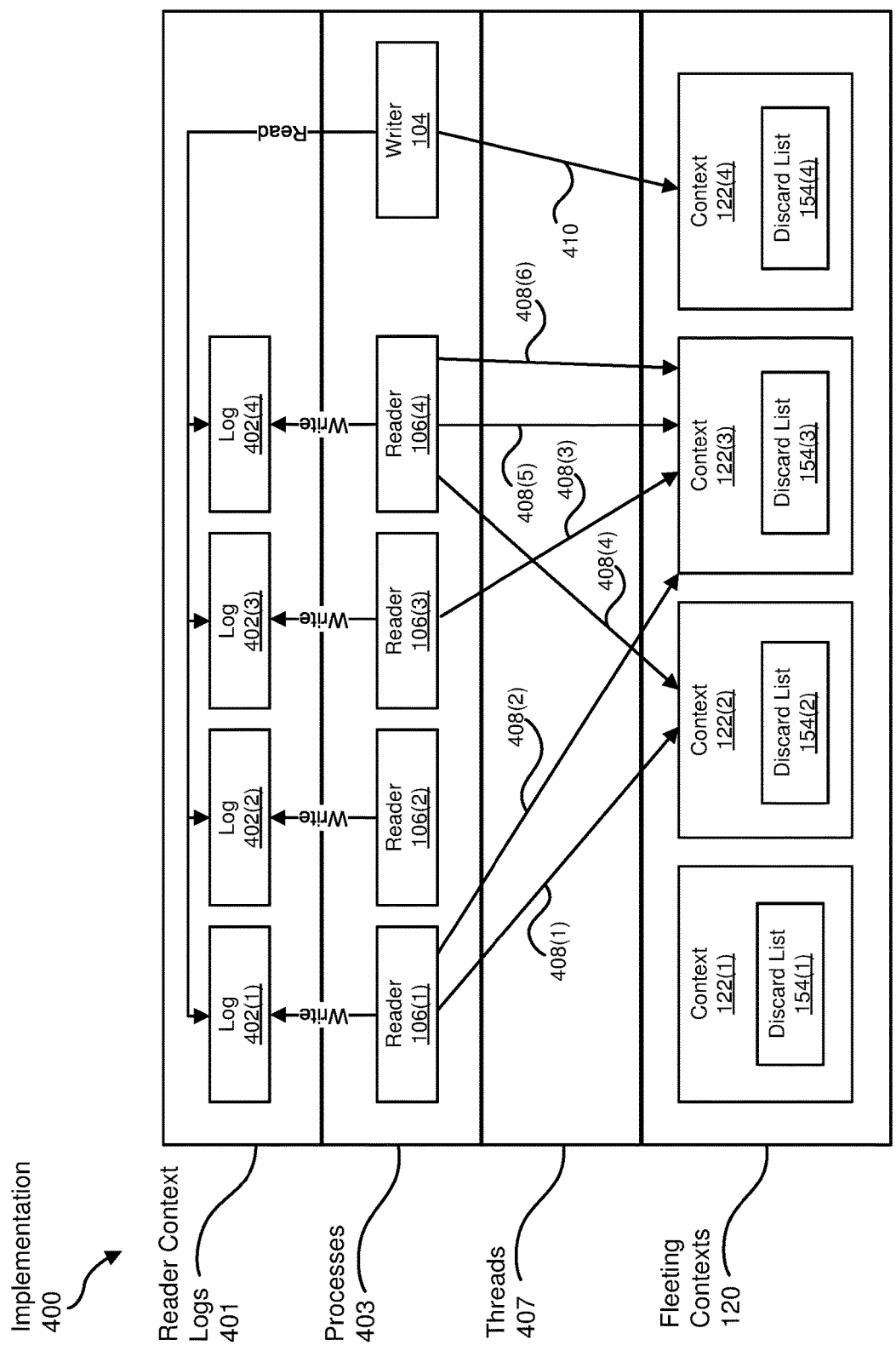
FIG. 4 is a block diagram of an exemplary implementation for lockless resource reclamation in single writer multiple reader systems.

FIG. 4 is a block diagram of an exemplary implementation 400 that demonstrates lockless resource reclamation in single writer multiple reader technologies. As illustrated in FIG. 4, exemplary implementation 400 may include and/or involve reader context logs 401, processes 403, threads 407, and/or fleeting contexts 120. In some examples, implementation 400 may be executed by and/or performed on one or more of computing devices 202, 224, and 226 in FIG. 2.

In one example, reader context logs 401 may include and/or represent logs 402(1), 402(2), 402(3), and 402(4). In this example, reader context logs 401 may each include and/or represent an individual file corresponding to a specific reader within processes 403. Additionally or alternatively, reader context logs 401 may include and/or represent discrete or separate portions of a single file that correspond to the set of readers within processes 403.

In some examples, processes 403 may include and/or represent readers 106(1), 106(2), 106(3), and 106(4) as well as a writer 104. In such examples, readers 106(1)-(4) may be able to read objects stored in shared memory by accessing fleeting contexts 120 via threads 407. Readers 106(1)-(4), however, may be unable to write, overwrite, modify, and/or delete those objects in shared memory. Instead, only writer 104 may be able to write, overwrite, modify, and/or delete those objects in shared memory.

In some examples, readers 106(1)-(4) may be able to write to logs 402(1)-(4), respectively. In such examples, readers 106(1)-(4) may maintain and/or update records of which of fleeting contexts 120 are currently accessed and/or utilized in logs 402(1)-(4). In addition, writer 104 may be able to read logs 402(1)-(4) to determine which of fleeting contexts 120 are currently accessed and/or utilized by readers 106 (1)-(4). By doing so, writer 104 may track the respective statuses and/or utilization levels of fleeting contexts 120.

In some examples, fleeting contexts 120 may each include and/or reference a discard list that identifies one or more objects to be discarded and/or removed from shared memory as the corresponding context expires and/or becomes obsolete. A context may expire and/or become obsolete if that context is the oldest among fleeting contexts 120 and is no longer being accessed by any of readers 106(1)-(4). For example, contexts 122(1), 122(2), 122(3), and 122(4) may include and/or reference discard lists 154(1), 154(2), 154(3), and 154(4), respectively. In one example, contexts 122(1)-(3) may constitute and/or represent those contexts that have already been published to readers 106(1)-(4) for accessing the objects stored in shared memory. However, in this example, context 122(4) may have yet to be published to readers 106(1)-(4). Instead, writer 104 may be in the process of creating and/or preparing context 122(4) for publication to readers 106(1)-(4). As part of this process, writer 104 may create and/or prepare discard list 154(4) for context 122(4) by performing a write operation 410 that populates discard list 154(4) with references to any shared objects that are no longer needed by readers 106(1)-(4) at that moment in time.

In some examples, each of threads 407 may constitute and/or represent a read operation and/or transaction performed by one of readers 106(1)-(4). Upon the completion and/or termination of one of threads 407, the corresponding reader may redeploy and/or relaunch that thread on the most recently published context within the set of fleeting contexts 120. In one example, the set of fleeting contexts 120 may be represented and/or displayed in FIG. 4 in a chronological order from oldest on the left to youngest on the right. Accordingly, context 122(1) may be the oldest among the set of fleeting contexts 120 in FIG. 4, and context 122(4) may be the youngest among the set of fleeting contexts 120 in FIG. 4. However, as described above, context 122(4) may not yet have been published to readers 106(1)-(4) at the moment in time represented in FIG. 4. Thus, context 122(3) may be the youngest published context at the moment in time represented in FIG. 4.

As illustrated in FIG. 4, none of readers 106(1)-(4) may be currently accessing context 122(1) via any of threads 407. Accordingly, context 122(1) may be effectively obsolete to readers 106(1)-(4), as readers 106(1)-(4) are programmed and/or configured to perform new read operations and/or transactions via the most recently published context with the set of fleeting contexts 120. In other words, because context 122(1) is the oldest among the set of fleeting contexts 120, readers 106(1)-(4) may refrain from performing any subsequent read operations and/or transactions via context 122(1). Instead, readers 106(1)-(4) may perform new read operations and/or transactions via context 122(3) at the moment in time represented in FIG. 4, as context 122(3) happens to be the youngest published context at that time. However, once context 122(4) is eventually published, readers 106(1)-(4) may perform new read operations and/or transactions via context 122(4) until a subsequent context is published.

As a specific example, readers 106(1)-(4) may write to and/or update logs 402(1)-(4), respectively, to indicate that readers 106(1)-(4) are currently accessing only contexts 122(2) and 122(3) at that moment in time. More specifically, log 402(1) may indicate and/or specify that reader 106(1) is currently accessing contexts 122(2) and 122(3) via threads 408(1) and 408(2), respectively. In this example, log 402(2) may indicate and/or specify that reader 106(2) is not currently accessing any of fleeting contexts 120. Log 402(3) may indicate and/or specify that reader 106(3) is currently accessing context 122(3) via thread 408(3). Additionally or alternatively, log 402(4) may indicate and/or specify that reader 106(4) is currently accessing context 122(2) via thread 408(4) and context 122(3) via threads 408(5) and 408(6).

Continuing with this example, writer 104 may read logs 402(1)-(4) to determine which of fleeting contexts 120 are currently being accessed by readers 106(1)-(4). In one example, writer 104 may determine that context 122(1) has become obsolete because none of readers 106(1)-(4) are still accessing context 122(1). As a result, writer 104 may determine and/or confirm that context 122(1) is the oldest among fleeting contexts 120.

In response to the determination that context 122(1) is the oldest and/or has become obsolete, writer 104 may search discard list 154(1) of context 122(1) for any and all references to shared objects that are no longer needed by readers 106(1)-(4). During this search, writer 104 may identify and/or locate various references to such objects within discard list 154(1). For example, and as illustrated in FIG. 5, discard list 154(1) may include and/or contain references 502, 504, 508, 510, 512, and/or 514. In this example, each of these references may lead, point, and/or correspond to certain shared objects that are no longer needed by readers 106(1)-(4) once context 122(1) expires and/or becomes obsolete.

Continuing with this example, writer 104 may reclaim the memory locations occupied by the objects corresponding to references 502, 504, 508, 510, 512, and/or 514 in shared memory. In other words, writer 104 may release and/or deallocate the memory locations storing those objects in shared memory. In one example, writer 104 may delete, remove, modify, and/or overwrite the objects stored in those memory locations. Additionally or alternatively, writer 104 may delete, remove, discard, and/or overwrite context 122(1) because it has expired and/or become obsolete.

In some examples, multiple contexts may expire and/or become obsolete simultaneously and/or nearly simultaneously. For example, when context 122(2) eventually expires and/or becomes obsolete, context 122(3) may also expire and/or become obsolete at the same time. As a result, writer 104 may reclaim the memory locations occupied by the objects referenced in discard lists 154(2) and 154(3) simultaneously. In this example, writer 104 may delete, remove, modify, and/or overwrite the objects stored in those memory locations. Additionally or alternatively, writer 104 may delete, remove, discard, and/or overwrite contexts 122(2) and 122(3) because they have expired and/or become obsolete.

Figure 6:
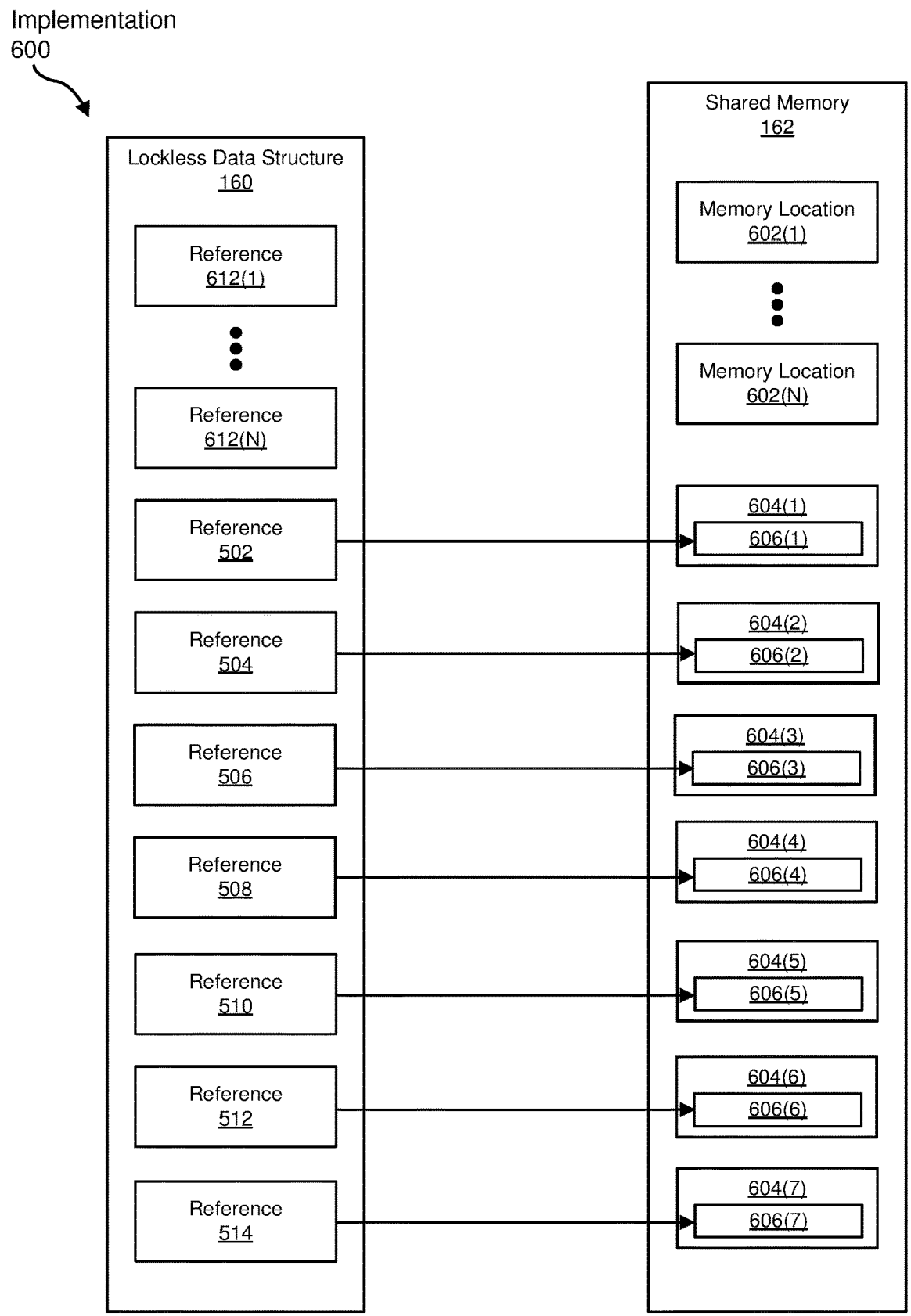
FIG. 6 is a block diagram of an exemplary implementation for lockless resource reclamation in single writer multiple reader systems.

FIG. 6 is a block diagram of an exemplary implementation 600 that demonstrates lockless resource reclamation in single writer multiple reader technologies. As illustrated in FIG. 6, exemplary implementation 600 may include and/or involve lockless data structure 160 whose state and/or configuration was represented by and/or captured in context 122(1). In this example, implementation 600 may also include and/or involve shared memory 162.

In one example, lockless data structure 160 may include and/or represent a set of references 612(1)-(N) that lead, point, and/or correspond to objects stored and/or maintained in shared memory 162. In this example, shared memory 162 may include and/or represent memory locations 602(1)-(N) that store and/or maintain certain objects accessible to readers 106(1)-(4). In addition, lockless data structure 160 may include and/or represent references 502, 504, 508, 510, 512, and/or 514 that lead, point, and/or correspond to objects 606(1), 606(2), 606(3), 606(4), 606(5), 606(6), and 606(7) stored and/or maintained in memory locations 604(1), 604(2), 604(3), 604(4), 604(5), 604(6), and 604(7) of shared memory 162.

Returning to FIG. 4, as log 402(2) indicates that reader 106(2) is not currently accessing any of fleeting contexts 120, writer 104 may attempt to apply and/or take a lock on log 402(2) to facilitate determining whether reader 106(2) has failed and/or stalled. In one example, writer 104 may determine that the attempt to apply the lock on reader 106(2) was successful, thereby indicating that reader 106(2) has indeed failed and/or stalled. In this example, writer 104 may determine and/or confirm that reader 106(2) is no longer functional or operational. In response to this determination and/or confirmation, computing device 202 may perform one or more actions in connection with reader 106(2). Examples of such actions include, without limitation, disregarding the information contained in log 402(2), shutting down reader 106(2), restarting or rebooting reader 106(2), replacing reader 106(2), redistributing tasks for which reader 106(2) is responsible, combinations or variations of one or more of the same, and/or any other suitable actions.

As a specific example, in response to this determination and/or confirmation, writer 104 may disregard and/or ignore the information contained in log 402(2) associated with reader 106(2). For example, if log 402(2) indicates that reader 106(2) is actively accessing context 122(1), writer 104 may disregard and/or ignore this misinformation and still determine and/or confirm that context 122(1) has expired and/or become obsolete within fleeting contexts 120 despite this misinformation. Writer 104 may disregard and/or ignore this misinformation because reader 106(2) has failed, so log 402(2) is no longer reliable.

In another example, writer 104 may determine that the attempt to apply the lock on reader 106(2) was unsuccessful, thereby indicating that reader 106(2) is still operational and/or functional despite its current lack of threads deployed on fleeting contexts 120. As a result, computing device 202 may refuse to perform any such actions in connection with reader 106(2) for the time being.

Figure 7:
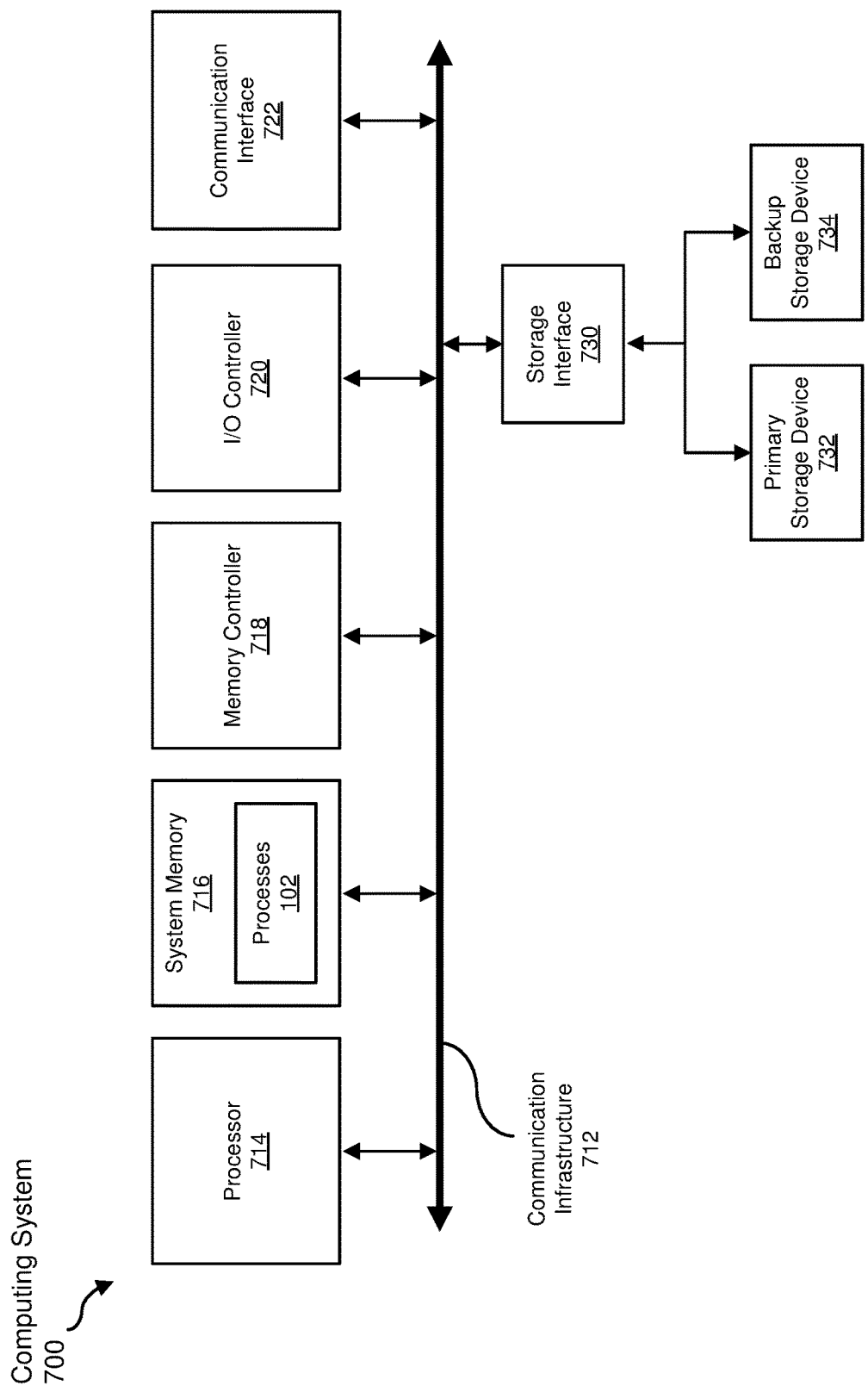
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    maintaining a set of fleeting contexts that represent a lockless data structure at different moments in time;
    identifying a set of readers capable of reading objects stored in shared memory via the set of fleeting contexts:
    determining an oldest context within the set of fleeting contexts;
    determining that none of the readers are currently reading any of the objects via the oldest context;
    identifying, within a discard list of the oldest context, a reference to an object stored in the shared memory; and
    reclaiming, in the shared memory, a memory location occupied by the object due at least in part to:
        none of the readers currently reading any of the objects via the oldest context; and
        the reference to the object occupying the memory location being identified within the discard list of the oldest context.

2. The method of claim 1, further comprising discarding the oldest context such that a subsequent context within the set of fleeting contexts becomes oldest among the set of fleeting contexts.

3. The method of claim 1, wherein determining that none of the readers are currently reading any of the objects via the oldest context comprises:
  identifying a set of logs that indicate all the fleeting contexts currently being accessed by the set of readers; and
  determining, based at least in part on the set of logs, that none of the readers are currently accessing the oldest context.

4. The method of claim 3, wherein the set of logs comprise a log that corresponds to a specific reader within the set of readers; and
  further comprising:
    attempting to apply a lock on the log that corresponds to the specific reader;
    determining that the attempt to apply the lock is successful; and
    determining that the specific reader is no longer operational due at least in part to the attempt to apply the lock being successful.

5. The method of claim 4, wherein determining that none of the readers are currently accessing the oldest context comprises, in response to determining that the specific reader is no longer operational, disregarding the log that corresponds to the specific reader when making the determination that none of the readers are currently accessing the oldest context.

6. The method of claim 1, wherein reclaiming the memory location occupied by the object in the shared memory comprises:
  performing a delete operation on the object stored in the shared memory; and
  refraining from locking any of the objects in connection with the lockless data structure such that the set of readers are able to read one or more of the objects via the set of fleeting contexts during the delete operation.

7. The method of claim 1, further comprising:
  detecting a command to read one or more of the objects in connection with a specific reader within the set of readers;
  identifying a most recently published context within the set of fleeting contexts; and
  directing the specific reader to read the one or more objects via the most recently published context within the set of fleeting contexts.

8. The method of claim 1, further comprising:
  issuing a command to discard an additional object that is stored in the shared memory in connection with the lockless data structure;
  preparing an additional context that:
    has yet to be published to a set of readers; and
    represents the lockless data structure at a subsequent moment in time;
  creating, for the additional context, an additional discard list that includes an additional reference to the additional object to account for the command; and
  adding the additional context to the set of fleeting contexts by publishing the additional context to the set of readers.

9. The method of claim 8, further comprising:
  determining, at a later moment in time, that the additional context has become oldest among the set of fleeting contexts;
  identifying, within the discard list of the additional context, the reference to the additional object; and
  reclaiming, in the shared memory, an additional memory location occupied by the additional object whose reference was identified within the discard list of the additional context.

10. The method of claim 9, wherein issuing the command comprises issuing the command to discard the additional object in connection with a delete operation that deletes the additional object altogether from the shared memory.

11. The method of claim 8, wherein preparing the additional context comprises:
  receiving an update to one or more objects included in the lockless data structure; and
  in response to the update, preparing the additional context for publication to the set of readers.

12. The method of claim 8, wherein preparing the additional context comprises:
  receiving a request to add one or more new objects to the lockless data structure;
  in response to the request:
    adding the one or more new objects to the lockless data structure; and
    preparing the additional context for publication to the set of readers.

13. The method of claim 1, wherein:
  the lockless data structure comprises at least a portion of a Forwarding Information Base (FIB) implemented on a network device; and
  the object comprises a route stored in the FIB implemented on the network device.

14. A system comprising:
  a writer;
  a set of readers capable of reading objects stored in shared memory; and
  at least one physical processing device configured to execute the writer and the set of readers such that the writer:
    maintains a set of fleeting contexts that represent a lockless data structure at different moments in time;
    determines an oldest context within the set of fleeting contexts;
    determines that none of the readers are currently reading any of the objects via the oldest context;
    identifies, within a discard list of the oldest context, a reference to an object stored in hg shared memory; and
    reclaims, in the shared memory, a memory location occupied by the object due at least in part to:
      none of the readers currently reading any of the objects via the oldest context; and
      the reference to the object occupying the memory location being identified within the discard list of the oldest context.

15. The system of claim 14, wherein the writer discards the oldest context such that a subsequent context within the set of fleeting contexts becomes oldest among the set of fleeting contexts.

16. The system of claim 14, wherein the writer:
  identifies a set of logs that indicate all the fleeting contexts currently being accessed by the set of readers; and
  determines, based at least in part on the set of logs, that none of the readers are currently accessing the oldest context.

17. The system of claim 14, wherein:
  the set of logs comprise a log that corresponds to a specific reader within the set of readers; and
  the writer:

attempts to apply a lock on the log that corresponds to the specific reader;

determines that the attempt to apply the lock is successful; and determines that the specific reader is no longer operational due at least in part to the attempt to apply the lock being successful.

18. An apparatus comprising:

at least one storage device that maintains a set of fleeting contexts that represent a lockless data structure at different moments in time;

at least one physical processing device communicatively coupled to the storage device, wherein the physical processing device:

identifies a set of readers capable of reading objects stored in shared memory via the set of fleeting contexts;

determines an oldest context within the set of fleeting contexts;

determines that none of the readers are currently reading any of the objects via the oldest context;

identifies, within a discard list of the oldest context, a reference to an object stored in the shared memory; and reclaims, in the shared memory, a memory location occupied by the object due at least in part to:

none of the readers currently reading any of the objects via the oldest context; and the reference to the object occupying the memory location being identified within the discard list of the oldest context.

* * * * *